No. 712,513. Patented Nov. 4, 1902.
F. W. ERICKSON.
OUTLET BUSHING FOR CONDUITS.
(Application filed Mar. 15, 1902.)
(No Model.)
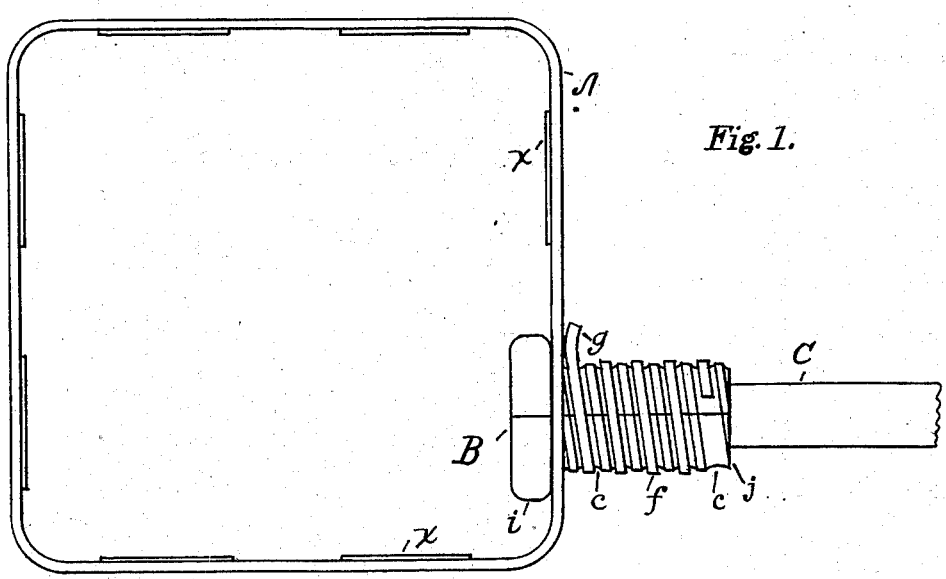
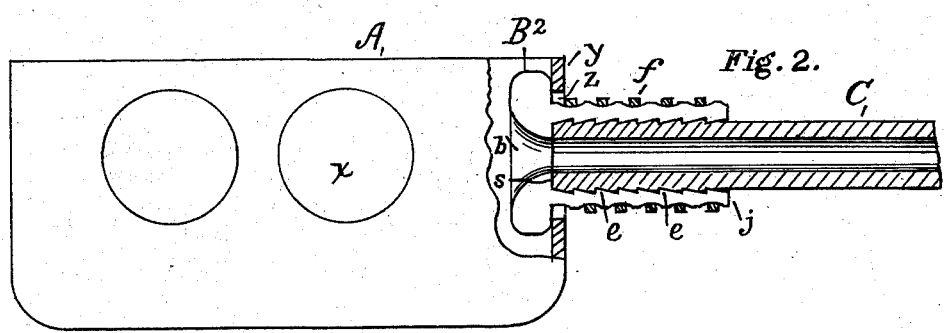
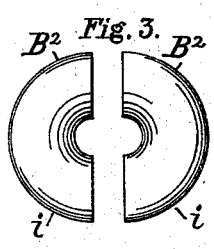 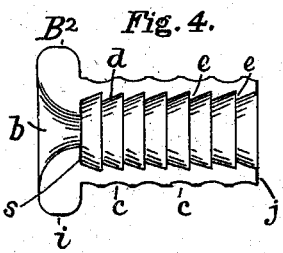 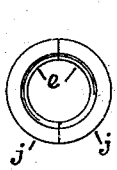 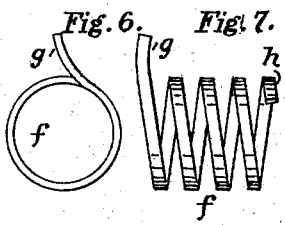
WITNESSES: INVENTOR.

UNITED STATES PATENT OFFICE.

FREDERICK W. ERICKSON, OF BOSTON, MASSACHUSETTS.

OUTLET-BUSHING FOR CONDUITS.

SPECIFICATION forming part of Letters Patent No. 712,513, dated November 4, 1902.

Application filed March 15, 1902. Serial No. 98,362. (No model.)

*To all whom it may concern:*

Be it known that I, FREDERICK W. ERICKSON, residing at Boston, in the county of Suffolk and State of Massachusetts, have invented certain Improvements in Outlet-Bushings for Conduits, of which the following is a specification.

This invention relates to interior conduit systems, which consist of pipes extending within the floors and partitions or walls of buildings and terminating at one or more outlet-boxes located in the said walls provided with detachable covers, so that as the conductors are brought from the pipes or conduits into the said boxes their ends may be attached to suitable terminals within or adjacent to the box. The ends of the conduits are usually extended within the boxes through orifices in their sides or bottoms and are secured to the box by means of thimbles or bushings, which at the same time guard the conductors from abrasion and consequent short circuits, all in a manner well understood.

It frequently happens that the insulated conductors are run between partitions upon insulators, and in such a case from the last insulator to the outlet-box the conductors are usually covered by or draw through a piece of flexible fabric conduit, the end of which is projected into the box, and the conductor is then drawn through the said flexible conduit into the box. The orifices in the walls of the box are usually made of standard sizes, and when conductors are drawn through flexible conduits as described much trouble is occasioned in properly securing the end of the small flexible conduit to the wall of the box, and the said conduit is often upon inspection found drawn out from the box, with the conductors left in contact with the sharp or rough edges of the box-orifice, permitting an air circulation through the box and the carriage thereby of dust, lint, and other small particles of inflammable substances, and as the insulation of the conductors becomes worn under favorable conditions a spark is developed which has been known to occasion a small fire in the vicinity of the box.

The invention addresses itself to means for overcoming the defects and subsequent damages of the indifferent method of making such splices; and it consists of a specially designed outlet-bushing made in two parts, having an enlarged inner head with a flaring orifice and a rearward-extending portion, which are adapted when placed together to grasp and firmly hold the end of the flexible conduit. The two parts are held to one another by a screw-nut, preferably in the form of a spring-clip, and securely lock the same to the walls of the outlet-box, as I will now proceed to describe, and point out in the claims.

In the drawings, Figure 1 is a top view of an outlet-box, showing the invention applied thereto. Fig. 2 is a side view of an outlet-box, showing the invention in section. Fig. 3 is an end view of the outlet-bushing. Fig. 4 is a side view of the inner surface of one of the parts forming the outlet-bushing. Fig. 5 is an end view of the former figure; and Figs. 6 and 7 are, respectively, end and side views of the spring-clip-locking device.

A represents an outlet-box of the style stamped up from a thin piece of metal with partially pressed-out disks $x$.

B represents the outlet-bushing as a whole, and it is shown as consisting of two semicylindrical longitudinal parts $B^2$, each substantially like the other.

$i$ is an enlarged head portion having a flaring orifice $b$, terminating at an abutment $s$. The rearwardly-extending cylindrical portion $j$ has its outer surface formed with a coarse helix or spiral $c\ c$, resembling a screw-thread, while the interior is hollow and its surface divided into rings of serrated ribs $d$, whose teeth $e$ project toward the orifice $b$ in the head $i$.

$f$ is a spiral spring, shown as made from a piece of square or flat resilient wire. It will be understood that the parts $i$ and $j$ may be of any cross-section other than round.

C represents a piece of flexible conduit made of fibrous insulating material and covered by a cotton braid such as is commonly employed in making short connections within the walls of buildings.

Figs. 1 and 2 show the various parts assembled and a connection made between the outlet-box A and the flexible conduit C. In making such a connection the two parts $B^2$ of the bushing B are placed together and inserted from the inside through the orifice $z$ in the wall $y$ of the box, from which a disk $x$ has been forced out, pressing the head parts $i$ against the inner face of the wall. The end of the flexible conduit C is then inserted between the parts $j$ of the bushing, so that it presses against the abutment $s$ on the inside of the head $i$. The spiral spring-clip $f$ is then sprung onto the periphery of the parts $j$ and turned thereupon, as would be a threaded nut, until the projecting part $g$ presses firmly against the outer face of the box-wall, as shown in Fig. 1. Not only does the spiral clip $f$ hold the two parts $B^2$ securely to one another and its end $g$ lock the bushing to the box-wall, but the ribs $d$ are so proportioned to the diameter of the flexible conduit that the teeth $e$ embed themselves in the surface of the conduit, so that it cannot be withdrawn except by tearing the surface thereof.

I prefer to mold the parts $B^2$ from suitable insulating material, such as porcelain or other plastic material, but do not limit myself to such material, as they may be made from cast metal of any kind or turned up from hard wood or insulating fiber, and in all cases it is desirable that the orifice $b$ be made smooth in order that no friction be developed in drawing insulated conductors over its surface. It is also within the spirit of my invention to provide other forms of ribs or substitutes therefor for retaining the flexible conduit in place, as any form of rough surface which will hold the conduit securely is within its scope.

It is evident that the portions $j$ of the parts $B^2$ can be proportioned to enable them to grasp and retain an ordinary insulated conductor in the same manner described of the flexible conduit.

I claim as my invention—

1. An outlet-bushing for interior conduits, composed of two similar hollow parts provided with an enlarged head and a smaller rearward portion, the head having a suitable orifice; the external surface of the rearward portion constituting a screw-thread, while the surface of the interior is roughened; with a screw-nut adapted to hold the two parts together.

2. An outlet-bushing for interior conduits, composed of two similar semicylindrical hollow parts provided with an enlarged head and a smaller rearward portion, the head having a suitable orifice; the external surface of the rearward portion constituting a screw-thread, while the surface of the interior is provided with sharp projections; with a resilient screw-clip adapted to hold the two parts together.

3. An outlet-bushing for interior conduits, composed of two similar semicylindrical hollow parts provided with an enlarged head and a smaller rearward portion, the head having a suitable orifice; the external surface of the rearward portion constituting a screw-thread, while the surface of the interior is divided into rings or ribs having sharp edges the angles of which are toward the head; with a flexible screw-clip adapted to hold the two parts together.

4. The combination with an outlet-box, of a bushing composed of two similar hollow parts provided with a head and a smaller rearward portion, the head having a suitable orifice; the external surface of the rearward portion forming a screw-thread, while the surface of the interior is roughened; a flexible conduit one end of which is inclosed by the said rearward portion; with a screw-nut in the form of a screw-clip adapted to hold the said two parts together with the flexible conduit between them, and lock them to the wall of the box.

5. The combination with an outlet-box, of a bushing composed of two similar semicylindrical hollow parts provided with a head and a smaller rearward portion, the head having a suitable orifice; the external surface of the rearward portion forming a screw-thread, while the surface of the interior is provided with sharp projections; a flexible conduit one end of which is inclosed by the said rearward portion; with a resilient screw-clip adapted to hold the said two parts together, with the flexible conduit between them, and lock them to the wall of the box.

In testimony whereof I have signed my name to this specification, in the presence of two subscribing witnesses, this 13th day of March, 1902.

FREDERICK W. ERICKSON.

Witnesses:
 JOHN A. COLE,
 LOUIS C. STERN.